United States Patent [19]

Carman et al.

[11] Patent Number: 6,001,952
[45] Date of Patent: Dec. 14, 1999

[54] POLYESTER CONTAINING BENZYLIDENE HAVING REDUCED FLUORESCENCE

[75] Inventors: Karen Lynn Carman; Martin Emerson Rogers, both of Blountville; Allan Scott Jones, Limestone; Max Allen Weaver, Kingsport, all of Tenn.

[73] Assignee: Eastman Chemical Company, Kingsport, Tenn.

[21] Appl. No.: 09/095,036

[22] Filed: Jun. 10, 1998

Related U.S. Application Data

[60] Provisional application No. 60/059,416, Jun. 18, 1997.

[51] Int. Cl.$^6$ .................................................. C08G 63/00
[52] U.S. Cl. ......................... 528/194; 528/176; 528/193; 528/271; 528/272
[58] Field of Search .................................. 528/176, 193, 528/194

[56] References Cited

U.S. PATENT DOCUMENTS

| | | | |
|---|---|---|---|
| 3,308,095 | 3/1967 | Maerov et al. | 260/47 |
| 3,322,680 | 5/1967 | Hedberg et al. | 252/301.2 |
| 3,359,153 | 12/1967 | Bean, Jr. | 161/189 |
| 4,338,247 | 7/1982 | Zannucci et al. | 528/307 |
| 4,446,262 | 5/1984 | Okumura et al. | 524/89 |
| 4,617,374 | 10/1986 | Pruett et al. | 528/288 |
| 4,619,956 | 10/1986 | Susi | 524/87 |
| 4,707,537 | 11/1987 | Pruett et al. | 528/288 |
| 4,749,773 | 6/1988 | Weaver et al. | 528/288 |
| 4,749,774 | 6/1988 | Weaver et al. | 528/288 |
| 4,826,903 | 5/1989 | Weaver et al. | 524/205 |
| 4,845,187 | 7/1989 | Weaver et al. | 528/288 |
| 4,845,188 | 7/1989 | Weaver et al. | 528/272 |
| 4,950,732 | 8/1990 | Weaver et al. | 528/288 |
| 5,057,594 | 10/1991 | Krutak et al. | 528/272 |
| 5,294,473 | 3/1994 | Kawamoto | 428/141 |
| 5,310,857 | 5/1994 | Jones et al. | 528/220 |
| 5,340,884 | 8/1994 | Mills et al. | 125/420 |
| 5,352,761 | 10/1994 | Jones et al. | 528/298 |
| 5,391,330 | 2/1995 | Jones et al. | 264/21 |
| 5,391,701 | 2/1995 | Jones et al. | 528/298 |
| 5,391,702 | 2/1995 | Jones et al. | 528/298 |
| 5,393,862 | 2/1995 | Jones et al. | 528/298 |
| 5,418,318 | 5/1995 | Jones et al. | 528/298 |
| 5,480,926 | 1/1996 | Fagerburg et al. | 524/86 |
| 5,593,818 | 1/1997 | Kawamoto | 430/512 |
| 5,804,357 | 9/1998 | Yamanouchi et al. | 430/438 |

FOREIGN PATENT DOCUMENTS

| | | | |
|---|---|---|---|
| 0 444 323 A2 | 9/1991 | European Pat. Off. | C07D 251/24 |
| 0 678 376 A1 | 10/1995 | European Pat. Off. | B32B 27/18 |
| 0 711 803 A2 | 5/1996 | European Pat. Off. | C08K 5/00 |
| 8-225672 | 9/1996 | Japan | C08J 7/04 |
| 432 842 | 9/1967 | Sweden | C08G 17/04 |
| 2 009 768 | 6/1979 | United Kingdom | C08K 5/34 |

OTHER PUBLICATIONS

Isuke Ouchi, Masahiro Hosoi, and Fujio Matsumoto, "Photodegradation of Poly(ethylene 2,6–Naphthalate) Films", Journal of Applied Polymer Science, vol. 20, 1983–1987 (1976).

N.S. Allen and J.F. McKellar, "Photochemical Reactions in Commercial Poly(Ethylene 2,6–Naphthalate)", Journal of Applied Polymer Science, vol. 22, 2085–2092 (1978).

John Scheirs & Jean–Luc Gardette, "Photo–oxidation and photolysis of poly(ethylene naphthalate)", Polymer Degradation and Stability 56 (1997) 339–350.

Chen, Bai, Qian, "Fluorescence Spectra of Poly(Ethylene–2, 6–Naphthalene Dicarboxylate)", Scientia Sinica, May 1981, vol. 24, No. 5 pp. 639–647.

Eastman Chemical Company, "PEN homoplymer gets FDA food–contact acceptance", Food, Cosmetics and Drug Packaging, Jun. 1996, p. 4.

Ping–Sun R. Cheung and Carleton W. Roberts, "Synthesis, Photodegradation, and Energy Transfer in a Series of Poly(ethylene Terephthalate–co–2,6–Naphthalenedicarboxylate) Copolymers", Journal of Applied Polymer Science, vol. 24, 1809–1830 (1979).

Fagerburg, Dr, Donelson, Me, "Effect of Uvcon Exposure on Coex Sheeting of PETG 14471 with Varying Levels of Cyasorb 3638 in a 5 mil Coex Layer", Technical Report Distribution Sheet, ECC Research Laboratories, Report No. 97–1000–002, Jan. 1997.

*Primary Examiner*—Terressa Mosley
*Attorney, Agent, or Firm*—Mark L. Davis; Bernard J. Graves; Harry J. Gwinnell

[57] ABSTRACT

A polymer composition having naphthalenedicarboxylic residue includes a fluorescence quenching benzylidene compound capable of absorbing ultraviolet light radiation. In a preferred embodiment, the composition includes at least a 0.1 mole percent of naphthalene-2,6-dicarboxylate and about 0.01 mole percent to about 5 mole percent of a benzylidene compound having the following structure:

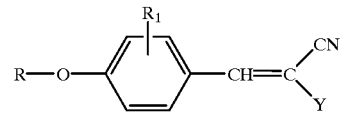

wherein R is selected from the group consisting of hydrogen, $C_1$–$C_8$ alkyl, substituted $C_1$–$C_8$ alkyl, $C_3$–$C_8$ alkenyl, $C_3$–$C_8$ alkynyl, $C_3$–$C_8$ cycloalkyl, $C_3$–$C_8$ cycloalkenyl and —$R_2$—X, wherein $R_2$ is selected from the group consisting of $C_1$–$C_8$ alkylene, $C_2$–$C_8$ alkylene-O—$C_2$–$C_8$ alkylene, $C_2$–$C_8$ alkylene-S—$C_1$–$C_8$ alkylene, $C_2$–$C_8$ alkylene, $C_2$–$C_8$ alkylene-S—$C_2$–$C_8$ alkylene, $C_2$–$C_8$ alkylene-N($SO_2C_{1-C_8}$ alkyl)-$C_2$–$C_8$ alkylene and X is selected from the group consisting of hydroxy, carboxy, carboalkoxy and acyloxy; $R_1$ is hydrogen or has 1–3 groups independently selected from the group consisting of hydroxy, $C_1$–$C_8$ alkyl, $C_1$–$C_8$ alkoxy and halogen; Y is selected from the group consisting of carbalkoxy, cyano, carbamoyl, substituted carbamoyl, aryl, aroyl, $C_1$–$C_8$ alkylsulfonyl and arylsulfonyl.

20 Claims, No Drawings

POLYESTER CONTAINING BENZYLIDENE HAVING REDUCED FLUORESCENCE

RELATED APPLICATION

This application claims the benefit of the United States provisional application having U.S. Ser. No. 60/059,416 filed Jun. 18, 1997, the entire disclosure being incorporated herein by reference.

BACKGROUND OF THE INVENTION

This invention relates to a polymer composition having reduced fluorescence, and particularly to a polymer blend composition containing naphthalenedicarboxylic acid residues and having incorporated therein benzylidene compounds. The invention further relates to a method for preparing the blend.

It is well known that dicarboxylic acids and dicarboxylic esters can be reacted with glycols to prepare polyesters. Polyesters are used in the fabrication of various articles for household, commercial or industrial use. Such uses included appliance parts, containers, and auto parts. A major drawback of many polyesters is their inherent bluish fluorescence. For example, articles prepared with the polyester poly(ethylene-2,6-naphthalene dicarboxylate), also known in the art as "PEN", have a hazy and bluish appearance. This phenomenon is of concern especially in packaging of products when their appearance is to be as close to their natural state as desired. For example, in the packaging of foods and beverages, if the food or beverages were inside a PEN container they may appear unnatural.

Typically, poly(ethylene 2,6-naphthalene dicarboxylate) contains repeat units from a dicarboxylic acid and a diol. The poly(ethylene 2,6-naphthalene dicarboxylate) can be prepared by conventional polycondensation procedures well-known in the art. Such procedures can include a combination of melt phase and solid state polymerization. Melt phase describes the molten state of PEN during the initial polymerization process. The initial polymerization process includes direct condensation of the naphthalene-2,6-dicarboxylic acid with the diol(s) or by ester interchange using naphthalene-2,6-dicarboxylic ester. The melt phase is concluded by extruding the PEN polymer into strands and pelletizing. Solid state polymerization involves heating PEN pellets to a temperature in excess of 200° C., but well below the crystalline melt point, either in the presence of an inert gas stream or in a vacuum to remove a diol.

Fluorescence is a type of luminescence in which an atom or molecule emits radiation, i.e., a photon, in passing from a higher to a lower electron state. The term is restricted to phenomena in which the time interval between absorption and emission energy is extremely short ($10^{-10}$ to $10^{-6}$ second). Quenching fluorescence eliminates or reduces the ability for photon emission by providing an alternative pathway for the excited state energy such as vibronic or heat loss, or intersystem crossing to the excited triplet state. Methods to quench fluorescence in PEN have been disclosed by Chen Shangxian, et al. in an article entitled, "Fluorescence Spectra of Poly(Ethylene 2,6-Naphthalene Dicarboxylate)" which appeared in SCIENTIA SINICA, Vol. XXIV, No. 5, May 1981, and by CAO Ti, et al. in an article entitled, "Intermolecular Excimer Interaction in Poly (Polytetramethylene Ether Glycol Aryl Dicarboxylate)" which appeared in ACTA CHIMICA SINICA, Vol. 42, No. 1, 1984. Both of the references disclose the use of o-chlorophenol to quench PEN fluorescence in a chloroform solution. Dissolving PEN in a chloroform solution to disperse the fluorescence quencher therein, however, is not practical since the PEN must have a low molecular weight to dissolve in the chloroform solution and only very dilute PEN solutions can be prepared.

Japanese Patent 08225672 discloses the use of coatings containing UV absorbers benzotriazoles, cyanoacrylates, benzophenones, and benzoxazinones to suppress the fluorescence of a molded product consisting mainly of polyalkylenenaphthalene-2,6-dicarboxylate. A disadvantage of using a coating to reduce fluorescence of PEN is the additional processing steps required to apply the coating to the molded article. The cost of coating adds significantly to the cost of the article.

European Patent 0711803 discloses mixing cyclic imino esters or quinoxalines with PEN as a method of reducing fluorescence in the polyalkylenenaphthalene-2,6-dicarboxylate. Blending the cyclic imino esters and quinoxalines with the polyalkylenenaphthalene-2,6-dicarboxylates resulted in moderate changes in the relative fluorescence intensity (37% to 58%) which is not enough to significantly improve the appearance of containers made from polymer compositions containing naphthalenedicarboxylic acid residues. European Patent 0711803 further discloses using UV absorbing coatings in combination with the above blends to reduce the relative fluorescence intensity to an adequate level.

U.S. Pat. Nos. 4,617,374 and 4,707,537 disclose the use of various benzylidene compounds as UV screens for polyesters. These patents teach that incorporating the benzylidene compounds in various polyesters at a concentration of 1 to 5000 ppm with a maximum absorbance of 320 nm to about 380 nm is effective in screening UV light. The patents do not disclose the use of the benzylidene compounds in polymer compositions containing naphthalenedicarboxylic acid residues. Polymer compositions containing naphthalenedicarboxylic acid residues such as poly(ethylene 2,6-naphthalenedicarboxylate) can absorb UV light up to 390 nm, thus, making UV absorbers ineffective as UV screens. U.S. Pat. Nos. 4,617,374 and 4,707,537 are unclear as to the effect the benzylidene compounds would have on the fluorescence intensity of polymer compositions containing naphthalenedicarboxylic acid residues.

U.S. Pat. No. 5,310,857 discloses reducing the fluorescence of a poly(ethylene 2,6-naphthalenedicarboxylate) polymer using from 0.1 to 5 mole percent of a copolymerizable aromatic ketone. The aromatic ketone has at least one acyl group directly attached to the aromatic ring.

U.S. Pat. No. 5,352,761 discloses certain naphthalene derivatives having substituted aroyl groups which are useful in providing reduced fluorescence in polyesters such as PEN and are copolymerizable with other polyesters.

U.S. Pat. No. 5,391,701 discloses using difunctional halo-aromatic compounds copolymerized with PEN to reduce the polymer's fluorescence.

U.S. Pat. Nos. 5,391,702 and 5,391,330 disclose a process for preparing PEN or dimethyl 2,6-naphthalene dicarboxylate containing copolyesters/fluorescence quencher blends via melt blending.

U.S. Pat. No. 5,393,862 discloses using nonhalogenated copolymerizable aromatic compounds such as benzene, naphthalene and biphenyl having at least one acyl group directly attached to the aromatic ring to reduced the fluorescence in polymers of dimethyl 2,6-naphthalene dicarboxylate.

U.S. Pat. No. 5,418,318 discloses the use of dimethyl 2,6-naphthalene dicarboxylate copolyesters or copolyamides having a copolymerized halo-aromatic compound and having reduced fluorescence.

Accordingly, there is a need for poly(ethylene 2,6-naphthalene dicarboxylate) having a reduced fluorescence without deleteriously affecting the physical properties of the polymer.

SUMMARY OF THE INVENTION

Broadly, the present invention is for a polyalkylenenaphthalene-2,6-dicarboxylate composition comprising residues of naphthalenedicarboxylic acid, a diol or diamine and a benzylidene compound capable of absorbing ultraviolet light radiation. Desirably, the composition without the benzylidene compound.

It is another aspect of the invention to provide a method for preparing a polymer blend containing poly(ethylene 2,6-naphthalene dicarboxylate) having a reduced fluorescence. The method includes the step of preparing a blend having residues of a dicarboxylic acid component, a diol component and a fluorescence quenching compound selected from a benzylidene compound.

It is an object of the invention to provide a polyalkylenenaphthalene-2,6-dicarboxylate composition having a reduced fluorescence.

It is another object of the invention to provide a poly (ethylene 2,6-naphthalene dicarboxylate) composition having a reduced fluorescence that is satisfactory for manufacturing goods where heat resistance, high glass transition temperature and gas barrier properties are desirable.

It is another object of the invention to provide a method of making a compositional blend having a naphthalenedicarboxylic acid containing polymer having reduced fluorescence.

These and other objects and advantages of the invention will become more fully appreciated by following the detailed description of the invention and the appended claims.

DETAILED DESCRIPTION OF THE INVENTION

The polymers of the present invention contain a polyester having naphthalenedicarboxylic acid residues and a fluorescence quenching compound. The polymers contain repeat units from a dicarboxylic acid, a diol or diamine, and a benzylidene compound. As used herein the fluorescence quenching compound is a benzylidene compound capable of absorbing ultraviolet light radiation. In a preferred embodiment, the polymer composition comprises repeat units from a dicarboxylic acid component having at least 0.1 mole percent of 2,6-naphthalenedicarboxylic acid or 2,6-naphthalenedicarboxylate esters; a diol or diamine component; and from about 0.01 to about 5 mole percent, based on 100 mole percent dicarboxylic acid and 100 mole percent diol, of a benzylidene compound and preferably, a copolymerizable benzylidene compound containing an acid, diacid, ester, diester, hydroxyl or diol functional moiety. More preferably, the polymer is a polyester containing repeat units from 0.1 to 100 mole percent of 2,6-naphthalenedicarboxylic acid or 2,6-naphthalenedicarboxylate ester, and 0 to 99.9 mole percent of terephthalic acid or dimethyl terephthalate, and at least 90 mole percent ethylene glycol.

The polyester dicarboxylic acid component may optionally be modified with 0.1 mole percent to about 30 mole percent of a difunctional acid selected from aromatic dicarboxylic acids desirably having 8 to 14 carbon atoms; aliphatic dicarboxylic acids desirably having 4 to 12 carbon atoms; or cycloaliphatic dicarboxylic acids desirably having 8 to 12 carbon atoms. As used herein the term "dicarboxylic acid" includes the corresponding acid anhydrides, esters, and acid chlorides of the acids. Nonlimiting examples of such dicarboxylic acids to be included with 2,6-naphthalenedicarboxylic acid, or 2,6-naphthalenedicarboxylate ester either alone or in combination are: phthalic acid; isophthalic acid; terephthalic acid; cyclohexanedicarboxylic acid; diphenyl-4,4'-dicarboxylic acid; succinic acid; glutaric acid; adipic acid; fumaric acid; azelaic acid; sebacic acid; 2,7-naphthalenedicarboxylic acid; 1,4-cyclohexanedicarboxylic acid; resorcinoldiacetic acid; diglycolic acid; 4,4'-oxybis(benzoic) acid; biphenyldicarboxylic acid; 1,12-dodecanedicarboxylic acid; 4,4'-sulfonyldibenzoic acid; 4,4'-methylenedibenzoic acid; trans-4,4'-stilbenedicarboxylic acid; and the like. Accordingly, the polyester may be prepared from one or more of the above dicarboxylic acids, esters of the acids or combinations thereof.

Diols suitable for forming the poly(ethylene 2,6-naphthalene dicarboxylate) having a reduced fluorescence include cycloaliphatic diols preferably having 6 to 20 atoms or aliphatic diols preferably having 2 to 20 carbon atoms. Nonlimiting examples of such diols include ethylene glycol, diethylene glycol, triethylene glycol, 1,4-cyclohexanedimethanol, propane-1,3-diol, butane-1,4-diol, pentane-1,5-diol, hexane-1,6-diol, 2,2-dimethyl-1,3-propanediol, 1,10-decanediol, 2,2,4,4-tetramethyl-1,3-cyclobutanediol, 3-methylpentanediol-(2,4), 2-methylpentanediol-(1,4), 2,2,4-trimethylpentane-diol-(1,3), 2-ethylhexanediol-(1,3), 2,2-diethylpropane-diol-(1,3), hexanediol-(1,3), 1,4-di-(hydroxyethoxy)-benzene, 2,2-bis-(4-hydroxycyclohexyl)-propane, 2,4-dihydroxy-1,1,3,3-tetramethyl-cyclobutane, 2,2-bis-(3-hydroxyethoxyphenyl)-propane, and 2,2-bis-(4-hydroxypropoxyphenyl)-propane.

Naphthalenedicarboxylic acid containing polyamides can be formed from adipic acid, isophthalic acid, terephthalic acid, 1,3- or 1,4-cyclohexanedicarboxylic acid, aliphatic diacids containing 6 to 12 carbon atoms, 1,6-hexanediamine, meta- or para-xylylenediamine, 1,3- or 1,4-cyclohexane(bis) methylamine, aliphatic diamines with 4 to 12 carbon atoms, other polyamide forming diacids and diamines and mixtures thereof.

The polyester may also contain small amounts of trifunctional or tetrafunctional comonomers such as trimellitic anhydride, trimethylolpropane, pyromellitic dianhydride, pentaerythritol, and other polyester forming polyacids or polyols generally known in the art.

The polymer may also contain polycarbonate repeat units formed form the reaction of a carbonic acid derivative with a diol such as bisphenol A. The polymer may be a blend of the above-described polyesters, polyamides, polycarbonates, or polyesteramides.

The polymer of the present invention further includes a fluorescence quenching compound comprising from about 0.01 to about 5 mole percent and preferably, from about 0.1 to about 2 mole percent of a benzylidene compound. Benzylidene compounds useful in the practice of the invention are disclosed in U.S. Pat. Nos. 4,845,287, 4,826,903, 4,749,774, 4,749,773, 4,707,537, 4,617,374, 4,338,247, 5,057,594, 4,950,732 and 4,845,188, the entire disclosures of each being incorporated herein by reference. Preferably, the benzylidene compounds of this invention contain at least one polyester reactive group selected from carboxy, carbalkoxy, acyloxy and hydroxy and have the following structure:

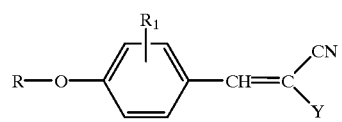

wherein R is selected from hydrogen, $C_1$–$C_8$ alkyl, substituted $C_1$–$C_8$ alkyl, $C_3$–$C_8$ alkenyl, $C_3$–$C_8$ alkynyl, $C_3$–$C_8$ cycloalkyl, $C_3$–$C_8$ cycloalkenyl and —$R_2$—X, wherein $R_2$ is selected $C_1$–$C_8$ alkylene, $C_2$–$C_8$ alkylene-O—$C_2$–$C_8$ alkylene, $C_2$–$C_8$ alkylene-S—$C_1$–$C_8$ alkylene, $C_2$–$C_8$ alkylene, $C_2$–$C_8$ alkylene-S—$C_2$–$C_8$ alkylene, $C_2$–$C_8$ alkylene-N($SO_2$ $C_1$–$C_8$ alkyl)-$C_2$–$C_8$ alkylene and X is selected from hydroxy, carboxy, carboalkoxy and acyloxy; $R_1$ is hydrogen or has 1–3 moieties independently selected from hydroxy, $C_1$–$C_8$ alkyl, $C_1$–$C_8$ alkoxy and halogen; Y is selected from carbalkoxy, cyano, carbamoyl, substituted carbamoyl, aryl, aroyl, $C_1$–$C_8$ alkylsulfonyl and arylsulfonyl.

As used herein, the term "$C_1$–$C_8$ alkyl" refers to straight and branched hydrocarbon radicals containing one to eight carbon atoms.

The term "substituted $C_1$–$C_8$ alkyl" refers to straight and branched chain hydrocarbon radicals containing one to eight carbon atoms and which are further substituted with a variety of common groups such as those disclosed in the definition of R in U.S. Pat. No. 4,617,374, column 12, line 49 to column 13, line 30, the disclosure being incorporated herein by reference. The preferred substituents are $C_1$–$C_8$ alkyl, $C_1$–$C_8$ alkoxy, hydroxy, cyano, $C_3$–$C_8$ cycloalkyl, acyloxy and halogen.

The term "$C_1$–$C_8$ alkoxy" is used to describe $C_1$–$C_8$ alkyl groups attached to oxygen, wherein, the $C_1$–$C_8$ alkyl portion is defined above.

The term "$C_3$–$C_8$ cycloalkenyl" is used to describe saturated cycloaliphatic radicals which contain three to eight carbon atoms.

The terms "$C_3$–$C_8$ alkenyl" and "$C_3$–$C_8$ alkynyl" are used to refer to unsaturated hydrocarbon radicals containing at least one carbon-carbon double bond and carbon-carbon triple bond, respectively.

The terms "$C_1$–$C_8$ alkylene" and "$C_2$–$C_8$ alkylene" are used to describe saturated divalent straight and branched chain hydrocarbon radicals and these substituted with at least one substituent selected from $C_1$–$C_8$ alkoxy, halogen, aryl, hydroxy and acyloxy.

The terms "carbalkoxy" and "acyloxy" are used to describe the radicals —$CO_2R_3$ and $R_4CO_2$—, respectively, wherein $R_3$ and $R_4$ are independently selected from $C_1$–$C_8$ alkyl, substituted $C_1$–$C_8$ alkyl, $C_3$–$C_8$ cycloalkyl, $C_3$–$C_8$ alkenyl, $C_3$–$C_8$ alkynyl and aryl.

The term "halogen" is used to refer to fluorine, chlorine, bromine and iodine.

The terms "aryl" and "aroyl" are used to describe phenyl and naphthyl radicals optionally substituted with one or more groups selected from $C_1$–$C_8$ alkyl, $C_1$–$C_8$ alkoxy, hydroxy and halogen and these radicals attached to a carbonyl moiety, respectively.

The terms "carbamoyl" and "substituted carbamoyl" are used to describe the radicals —$CONH_2$ and —$CON(R_3)R_4$, respectively, wherein $R_3$ and $R_4$ are as defined previously.

The polymer compositions containing naphthalenedicarboxylic acid residues with the fluorescence quenching compound can be prepared by conventional polycondensation procedures well-known in the art which generally include a combination of melt phase and solid state polymerization discussed herein. For example, dimethyl-2,6-naphthalenedicarboxylate is ester interchanged with ethylene glycol at elevated temperatures in the presence of the copolymerizable benzylidene compound and a catalyst. In a preferred embodiment, the benzylidene compound is copolymerized in the polymer backbone.

Typical catalyst which may be used include titanium alkoxides, dibutyl tin dilaurate, combinations of zinc, manganese, or magnesium acetates or benzoates with antimony oxide or antimony triacetate.

Optionally, the benzylidene compound, either with or without copolymerizable groups, can be added to the polyester by direct melt blending the polymer compositions containing naphthalenedicarboxylic acid residues and the benzylidene compound. Although not preferred, a "master batch" of the polyester having the benzylidene compounds at much higher than desired concentrations can be melt blended with the polymer composition containing naphthalenedicarboxylic acid residues to obtain the desired composition. Although not wishing to be bound by any theory, it is believed that using more than 5 mole percent of the fluorescence quenching compound hinders the crystallization of the polyester and results in inferior physical properties.

The inherent viscosity of the polymer compositions containing naphthalenedicarboxylic acid residues should be 0.3 to 1.5 dL/g. However, inherent viscosities of from 0.4 to 1.1 are preferred, as measured at 25 C using 0.25 grams of polymer per 50 ml of a solvent consisting of 60% by weight pentafluorophenol and 40% by weight 1,3,5-trichlorobenzene.

The polymer compositions of the invention may be further melt blended with other polymers, and desirably, compatible polyesters. Compatible polyesters which may be blended with the polymer compositions of the invention are generally based on terephthalic acid, 1,4-cyclohexanedicarboxylic acid, isophthalic acid, naphthalenedicarboxylic acid and the like, and one or more glycols containing 2 to about 12 carbon atoms. Preferred glycols include ethylene glycol, 1,4-butanediol, 1,6-hexanediol, 1,4-cyclohexanedimethanol, and 2,2-dimethyl-1,3-propanediol. Homo and copolyesters may be used. The copolyesters may contain up to about 50 mole % of modifying dibasic acids and/or glycols. Typical modifying dibasic acids include isophthalic, adipic, glutaric, azelaic, sebacic, and the like while modifying glycols will include those having 2 to 12 carbon atoms and may be aliphatic or alicyclic in nature. Useful polyesters include PET, PET copolyester containing up to 20 mole % isophthalic acid, PET copolyester containing up to 70 mole % 1,4-cyclohexanedimethanol, PET copolyester containing up to 37 mole % diethylene glycol, PET copolyester containing up to 50 mole % 1,4-butanediol, poly(1,4-butyleneterephthalate)(PBT), PBT copolyester containing up to 15 mole % ethylene glycol, poly(ethylene 1,4-cyclohexanedicarboxylate), poly(1,4-cyclohexyldimethylene terephthalate) (PCT), PCT copolyester containing up to 18 mole % ethylene glycol, PCT copolyester containing up to 40 mole percent isophthalic acid, polycarbonate and the like. All of these polyesters are readily prepared by methods well known to those skilled in the art.

Blends of the polymer composition with other polyesters generally contain about 0.1 weight percent to about 99.9 weight percent of the naphthalene dicarboxylate polymer composition. Such blends are readily prepared using conventional melt processing equipment such as a Brabender extruder, single-screw extruder, twin-screw extruder and the like. The blends are generally processed at temperatures in the range of about 260° C. to about 330° C. Properties of the blends may be altered significantly depending on the mixing temperature and mixing time. Generally, processing times in the range of about 0.4 to about 5 minutes are useful to achieve the desired results.

The polymer compositions of the invention serve as excellent starting materials for the production of moldings of all types. The polymer compositions containing naphthalenedicarboxylic acid residues may also be blended with other polymers. Specific applications include food packaging such as bottles, trays, lids and films, medical parts, appliance parts, automotive parts, tool housings, recreational and utility parts. The molding compositions of the present invention are especially useful in applications that require transparent molded parts. Additionally, the polymers can be used to prepare extruded sheets for thermoforming applications. The polymers are readily extruded into films or processed into monolayer or multi layer food and beverage containers. Potential methods for producing containers include: (1) injection stretch blow molding using either one or two stage technology, (2) injection blow molding, (3) extrusion blow molding, (4) pipe extrusion, and (5) co-injection or co-extrusion where the polymers can serve as either the structural layer or barrier layer depending upon end use requirements. Fibers, melt-blown webs, extruded sheets, vacuum-drawn trays/parts, injection molded parts, and extrusion coated wires may also be made from these polymers.

Many other ingredients can be added to the compositions of the present invention to enhance the performance properties of the naphthalene dicarboxylate resin containing an ultraviolet absorber. For example, surface lubricants, denesting agents, stabilizers, antioxidants, mold release agents, metal activators, colorants such as black iron oxide and carbon black, nucleating agents, phosphate stabilizers, zeolites, fillers and the like can be included. All of these additives and the use thereof are well known in the art. Any of these can be used so long as they do not hinder the present invention from accomplishing its objects.

The present invention will be further illustrated by a consideration of the following examples, which are intended to be exemplary of the invention. All parts and percentages in the examples are on a molar basis unless otherwise stated.

The materials and testing procedures used for the results shown herein are as follows:

The fluorescence intensities, I and $I_o$, of examples 1–4 and 7–12 were measured on a LS-5B Luminescence Spectrometer using a Xenon Lamp as the light source. The slit width was 10 for excitation and 20 for emission. The emission spectra were measured from 360 nm to 700 nm at an excitation wavelength of 350 nm.

The fluorescence intensities, I and $I_o$, of examples 5 and 6 were measured on a Perkin Elmer Luminescence Spectrometer LS50B with Front Surface Accessory. The slit width was 5 for excitation and 4 for emission. The emission spectra were measured from 360 nm to 650 nm with a excitation wavelength of 350 nm.

In Examples 1–6 amorphous 15 mil (0.015 of an inch) films were used to determine the specified material's fluorescence intensity. In preparing a film, the specified polymer was ground to a dimension of less than 3 millimeters, i.e. the material would pass through a 3 millimeter mesh screen. Approximately, 13 grams of the ground polymer was melt pressed at 1000 psi between ferric plates at a temperature of about 300° C. and for about two minutes. The films were cooled using cold water. Fluorescence measurements were taken as noted above.

The fluorescence intensities of examples 7–12 were measured on crystalline powders. Sample preparation for determining fluorescence intensity involved grinding the polyester to a particle size of about 3-4 millimeters. The samples were then micro pulverized in an analytical grinding mill and passed through a 120 mesh screen. Except for Example 7, the powders were dried for 24 hours at 140° C. Approximately 0.5 of a gram of the powder was packed into a sample holder and measurements were taken as noted above.

Inherent viscosity (IhV) measurements were made at 25° C. 0.25 grams of the sample material were dissolved in 50 ml of a 60/40 (w/w) pentafluorophenol/1,3,5-trichlorobenzene (PFP/TCB) solvent system.

EXAMPLE 1

Poly(ethylene 2,6-naphthalenedicarboxylate) Was Prepared by the Following Procedure Dimethyl 2,6-naphthalenedicarboxylate (0.25 mol, 61 g), ethylene glycol (0.5 mol, 31 g) and catalyst metals were placed in a 500 milliliter (mL) polymerization reactor under a nitrogen atmosphere. The mixture was stirred and heated to 200° C. The temperature was maintained steady for 90 minutes. The temperature was increased to 220° C. and maintained steady for 80 minutes. The temperature was increased to 285° C. over a period of about 20 minutes, at which point the nitrogen flow was stopped and vacuum was applied. The polymer was stirred under vacuum (about 0.3 mm Hg) for 30 minutes. The polymer was cooled, ground and a compression molded film prepared. The polymer had an inherent viscosity of 0.48 dL/g IhV. The fluorescence data is summarized in Table 1.

EXAMPLE 2

Poly(ethylene 2,6-naphthalenedicarboxylate) Containing 0.5 Mole Percent Copolymerized Methyl 2-cyano-3(4-methoxyphenyl)propenoate Was Prepared by the Following Procedure Dimethyl 2,6-naphthalenedicarboxylate (0.25 mol, 61 g), methyl 2-cyano-3(4-methoxyphenyl)propenoate (0.00125 mol, 0.27 g), ethylene glycol (0.5 mol, 31 g) and catalyst metals were placed in a 500 mL polymerization reactor under a nitrogen atmosphere. The mixture was stirred and heated to 200° C. The temperature was maintained steady for 90 min. The temperature was increased to 220° C. and maintained steady for 80 min. The temperature was increased to 285° C. over a period of about 20 minutes, at which point the nitrogen flow was stopped and vacuum was applied. The polymer was stirred under vacuum (about 0.3 mm Hg) for 30 minutes. The polymer was cooled, ground and a compression molded film prepared. The polymer had an inherent viscosity of 0.71 dL/g IhV. The fluorescence data is summarized in Table 1.

EXAMPLE 3

Poly(ethylene 2,6-naphthalenedicarboxylate) Containing 0.5 Mole Percent Copolymerized Methyl 2-cyano-3(3-phenoxyphenyl)propenoate Was Prepared by the Following Procedure Dimethyl 2,6-naphthalenedicarboxylate (0.25 mol, 61 g), methyl 2-cyano-3(3-phenoxyphenyl)propenoate (0.00125 mol, 0.35 g), ethylene glycol (0.5 mol, 31 g) and catalyst metals were placed in a 500 mL polymerization reactor under a nitrogen atmosphere. The mixture was stirred and heated to 200° C. The temperature was maintained steady for 90 min. The temperature was increased to 220° C. and maintained steady for 80 min. The temperature was increased to 285° C. over a period of about 20 minutes, at which point the nitrogen flow was stopped and vacuum was applied. The polymer was stirred under vacuum (0.3 mm Hg) for 30 minutes. The polymer was cooled, ground and a compression molded film prepared. The polymer had 0.53 dL/g IhV. The fluorescence data is summarized in Table 1.

EXAMPLE 4

Poly(ethylene 2,6-naphthalenedicarboxylate) Containing 0.5 Mole Percent Copolymerized Ethyl 2-cyano-3[4-(carbethoxymethyloxy)phenyl]propenoate was Prepared by the Following Procedure Dimethyl 2,6-naphthalenedicarboxylate (0.25 mol, 61 g), ethyl 2-cyano-3[4-(carbethoxymethyloxy)phenyl]propenoate (0.00125 mol, 0.34 g), ethylene glycol (0.5 mol, 31 g) and catalyst metals were placed in a 500 mL polymerization reactor under a nitrogen atmosphere. The mixture was stirred and heated to 200° C. The temperature was maintained steady for 90 min. The temperature was increased to 220° C. and maintained steady for 80 min. The temperature was increased to 285° C. over a period of about 20 minutes, at which point the nitrogen flow was stopped and vacuum was applied. The polymer was stirred under vacuum (0.3 mm Hg) for 30 minutes. The polymer was cooled, ground and a compression molded film prepared. The polymer had 0.72 dL,/g IhV. The fluorescence data is summarized in Table 1.

EXAMPLE 5

Poly(ethylene terephthalate) Containing 10 Mole Percent Copolymerized 2,6-naphthalenedicarboxylate (90PET-co-10PEN) Was Prepared by the Following Procedure Dimethyl terephthalate (0.225 mol, 43.7 g), dimethyl 2,6-naphthalenedicarboxylate (0.025 mol, 6.1 g), ethylene glycol (0.5 mol, 31 g), and catalyst metals were placed in a 500 mL polymerization reactor under a nitrogen atmosphere. The mixture was stirred and heated to 200° C. The temperature was maintained steady for 90 min. The temperature was increased to 220° C. and maintained steady for 80 min. The temperature was increased to 285° C. over a period of about 20 minutes, at which point the nitrogen flow was stopped and vacuum was applied. The polymer was stirred under vacuum (0.3 mm Hg) for 30 minutes. The polymer was cooled, ground and a compression molded film prepared. The polymer had 0.45 dL/g IhV. The fluorescence data is summarized in Table 1.

EXAMPLE 6
Poly(ethylene terephthalate) Containing 10 Mole Percent Copolymerized 2,6-naphthalenedicarboxylate and 0.5 Mole Percent Methyl 2-cyano-3(4-methoxyphenyl)propenoate Was Prepared by the Following Procedure Dimethyl terephthalate (0.225 mol, 43.7 g), dimethyl 2,6-naphthalenedicarboxylate (0.025 mol, 6.1 g), methyl 2-cyano-3(4-methoxyphenyl)propenoate (0.00125 mol, 0.27 g), ethylene glycol (0.5 mol, 31 g), and catalyst metals were placed in a 500 mL polymerization reactor under a nitrogen atmosphere. The mixture was stirred and heated to 200° C. The temperature was maintained steady for 90 min. The temperature was increased to 210° C. and maintained for 60 min. The temperature was increased to 280° C., at which point the nitrogen flow was stopped and vacuum applied. The polymer was stirred under vacuum (0.2 mm Hg) for 40 min. The polymer was cooled, ground and a compression molded film prepared. The polymer had 0.48 dL/g IhV. The fluorescence data is summarized in Table 1.

TABLE 1

Fluorescence Intensity of PEN Homopolymers and PET-co-PEN Copolymers With and Without Fluorescence Quencher

| Example | Polymer | Quencher Mole % | Maximum Wavelength, nm | Fluorescence Intensity | $I_0/I$** |
|---|---|---|---|---|---|
| 1 | PEN | none | 424 | 1120 | 1.0 |
| 2 | PEN | 0.5 | 432 | 218 | 5.1 |
| 3 | PEN | 0.5 | 427 | 890 | 1.3 |
| 4 | PEN | 0.5 | 429 | 380 | 2.9 |
| 5 | 90PET-co-10PEN | none | 395 | 275* | 1 |
| 6 | 90PET-co-10PEN | 0.5 | 388 | 3* | 92 |

*The fluorescence intensities of examples 5 and 6 were measured on a different instrument and cannot be compared to examples 1–4.
**$I_0$ is the intensity of polymer without a fluorescencing quencher and I is the intensity of the corresponding polymer with a fluorescencing quencher.

EXAMPLE 7
Melt Extrusion of Poly(ethylene-2,6-naphthalate)

PEN homopolymer pellets were dried overnight at 140° C. in a forced air drying unit. The dried PEN pellets (297 grams) were added to a 19 mm Brabender single-screw extruder with an L/D ratio of 25/1. The extruder was equipped with a mixing screw with a 3:1 compression ratio and six rows of staggered pins near the nozzle. The average residence time in the extruder was 1.5 minutes. All zones were set at 300° C. The actual melt temperature was 305° C.–310° C. The extruded rod was quenched in water and chopped. The pellets were then crystallized at 200° C. in a forced air oven for two hours. The crystallized pellets were pulverized into a powder form and fluorescence intensity measurements taken. The fluorescence data is summarized in Table 2.

EXAMPLE 8
Melt Blend of Poly(ethylene-2,6-naphthalate) with Methyl 2-cyano-3(4-methoxyphenyl)propenoate PEN homopolymer pellets were dried overnight at 140° C. in a forced air drying unit. The dried PEN pellets (297 grams) and methyl 2-cyano-3(4-methoxyphenyl)propenoate (3 grams) were blended in a bag, extruded, crystallized and ground as described above. The fluorescence data is summarized in Table 2.

EXAMPLE 9
Melt Blend of Poly(ethylene-2,6-naphthalate) with Methyl 2-cyano-3(4-hydroxyphenyl)propenoate PEN homopolymer pellets were dried overnight at 140° C. in a forced air drying unit. The dried PEN pellets (297 grams) and methyl 2-cyano-3(4-hydroxyphenyl)propenoate (3 grams) were blended in a bag and extruded, crystallized and ground as described in Example 7. The fluorescence data is summarized in Table 2.

EXAMPLE 10
Melt Extrusion of Poly(ethylene terephthalate) Containing 8 Mole Percent Copolymerized 2,6-naphthalenedicarboxylate 92PET-co-8PEN pellets were dried overnight at 140° C. in a forced air drying unit. The dried PEN pellets (297 grams) were added to a 19 mm Brabender single-screw extruder with an L/D) ratio of 25/1. The extruder was equipped with a mixing screw with a 3:1 compression ratio and six rows of staggered pins near the nozzle. The average residence time in the extruder was 1.5 minutes. All zones were set at 280° C. The extruded rod was quenched in water and chopped. The pellets were then crystallized at 180° C. in a forced air oven for two hours. The crystallized pellets were pulverized into a powder form for fluorescence intensity measurements. The fluorescence data is summarized in Table 2.

EXAMPLE 11
Melt Extrusion of Poly(ethylene terephthalate) Containing 8 Mole Percent Copolymerized 2,6-naphthalenedicarboxylate with Methyl 2-cyano-3(4-methoxyphenyl)propenoate 92PET-co-8PEN pellets were dried overnight at 140° C. in a forced air drying unit. The dried 92PET-co-8PEN pellets (297 grams) and methyl 2-cyano-3(4-methoxyphenyl) propenoate (3 grams) were blended in a bag and extruded, crystallized and ground as described in Example 11. The fluorescence data is summarized in Table 2.

EXAMPLE 12
Melt Extrusion of Poly(ethylene terephthalate) Containing 8 Mole Percent Copolymerized 2,6-naphthalenedicarboxylate with Methyl 2-cyano-3(4-hydroxyphenyl)propenoate 92PET-co-8PEN pellets were dried overnight at 140° C. in a forced air drying unit. The dried 92PET-co-8PEN pellets (297 grams) and methyl 2-cyano-3(4-hydroxyphenyl) propenoate (3 grams) were blended in a bag and extruded, crystallized and ground as described in Example 11. The fluorescence data is summarized in Table 2.

TABLE 2

Fluorescence Intensity of PEN Homopolymers and PEN Melt Blended With Fluorescence Quencher

| Example | Polymer | Quencher Mole % | Maximum Wavelength, nm | Fluorescence Intensity | $I_0/I$* |
|---|---|---|---|---|---|
| 7 | PEN | none | 427 | 924 | 1.0 |
| 8 | PEN | 1.1 | 428 | 245 | 3.8 |
| 9 | PEN | 1.2 | 426 | 156 | 5.9 |

TABLE 2-continued

Fluorescence Intensity of PEN Homopolymers and
PEN Melt Blended With Fluorescence Quencher

| Example | Polymer | Quencher Mole % | Maximum Wavelength, nm | Fluorescence Intensity | $I_0/I$* |
|---|---|---|---|---|---|
| 10 | 92PET-co-8PEN | none | 387 | 1425 | 1.0 |
| 11 | 92PET-co-8PEN | 1.1 | 405 | 78 | 18 |
| 12 | 92PET-co-8PEN | 1.2 | 409 | 52 | 27 |

*$I_0$ is the intensity of polymer without quencher and I is the intensity of the corresponding polymer with quencher Although the present invention has been described in terms of the presently preferred embodiment, it is to be understood that such disclosure is not to be interpreted as limiting to the invention described herein. No doubt that after reading the disclosure, various alterations and modifications will become apparent to those skilled in the art to which the invention pertains. It is intended that the appended claims be interpreted as covering all such alterations and modifications as fall within the spirit and scope of the invention.

We claim:

1. A polymer containing a naphthalenedicarboxylic acid residue consisting essentially of a fluorescence quenching compound selected from a benzylidene compound capable of absorbing ultraviolet light radiation wherein said benzylidene compound has the following structure:

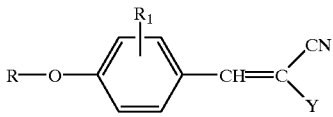

wherein R is selected from the group consisting of hydrogen, $C_1$–$C_8$ alkyl, substituted $C_1$–$C_8$ alkyl, $C_3$–$C_8$ alkenyl, $C_3$–$C_8$ alkynyl, $C_3$–$C_8$ cycloalkyl, $C_3$–$C_8$ cycloalkenyl and $BR_2$—X, wherein $R_2$ is selected from the group consisting of $C_1$–$C_8$ alkylene, $C_2$–$C_8$ alkylene-O—$C_2$–$C_8$ alkylene, $C_2$–$C_8$ alkylene-S—$C_1$–$C_8$ alkylene, $C_2$–$C_8$ alkylene, $C_2$–$C_8$ alkylene-S—$C_2$–$C_8$ alkylene, $C_2$–$C_8$ alkylene-N($SO_2$ $C_1$–$C_8$ alkyl)-$C_2$–$C_8$ alkylene and X is selected from the group consisting of hydroxy, carboxy, carboalkoxy and acyloxy; $R_1$ is hydrogen or has 1–3 moieties independently selected from the group consisting of hydroxy, $C_1$–$C_8$ alkyl, $C_1$–$C_8$ alkoxy and halogen; Y is selected from the group consisting of carbalkoxy, cyano, carbamoyl, substituted carbamoyl, aryl, aroyl, $C_1$–$C_8$ alkylsulfonyl and arylsulfonyl and wherein said benzylidene compound reduces the fluorescence by a ratio greater than about 3 relative to a similar compound without said fluorescent quenching compound.

2. The polymer of claim 1 wherein said benzylidene compound includes a polyester reactive group selected from carboxy, carbalkoxy, acyloxy and hydroxy.

3. The polymer of claim 1 wherein said naphthalenedicarboxylic acid residue is poly(ethylene 2,6-naphthalene dicarboxylate).

4. A polymer containing a naphthalenedicarboxylic acid residue consisting essentially of:

(a) a dicarboxylic acid component having at least 0.1 mole percent of a dicarboxylic acid selected from the group consisting of naphthalene-2,6-dicarboxylic acid, and naphthalene-2,6-dicarboxylate ester;

(b) a diol or diamine component; and (c) about 0.01 mole percent to about 5 mole percent, based on 100 mole percent dicarboxylic acid and 100 mole percent diol or diamine, of a benzylidene compound capable of absorbing ultraviolet light radiation, wherein said polymer has a reduced fluorescence, wherein said benzylidene compound has the following structure:

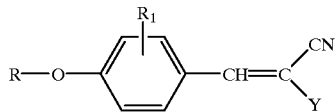

wherein R is selected from the group consisting of hydrogen, $C_1$–$C_8$ alkyl, substituted $C_1$–$C_8$ alkyl, $C_3$–$C_8$ alkenyl, $C_3$–$C_8$ alkynyl, $C_3$–$C_8$ cycloalkyl, $C_3$–$C_8$ cycloalkenyl and $BR_2$—X, wherein $R_2$ is selected from the group consisting of $C_1$–$C_8$ alkylene, $C_2$–$C_8$ alkylene-O—$C_2$–$C_8$ alkylene, $C_2$–$C_8$ alkylene-S—$C_1$–$C_8$ alkylene, $C_2$–$C_8$ alkylene, $C_2$–$C_8$ alkylene-S—$C_2$–$C_8$ alkylene, $C_2$–$C_8$ alkylene-N($SO_2$ $C_1$–$C_8$ alkyl)-$C_2$–$C_8$ alkylene and X is selected from the group consisting of hydroxy, carboxy, carboalkoxy and acyloxy; $R_1$ is hydrogen or has 1–3 moieties independently selected from the group consisting of hydroxy, $C_1$–$C_8$ alkyl, $C_1$–$C_8$ alkoxy and halogen; Y is selected from the group consisting of carbalkoxy, cyano, carbamoyl, substituted carbamoyl, aryl, aroyl, $C_1$–$C_8$ alkylsulfonyl and arylsulfonyl and wherein said benzylidene compound reduces the fluorescence by a ratio greater than about 3 relative to a similar compound without said fluorescent quenching compound.

5. The polymer of claim 4 wherein said benzylidene compound includes a functionalizing moiety selected from the group consisting of an acid, a diacid, an ester, a diester, hydroxyl and a diol.

6. The polymer of claim 4 wherein said dicarboxylic acid component, (a), has from about 0.1 to about 99.9 mole percent of a dicarboxylic acid selected from the group consisting of naphthalene-2,6-dicarboxylic acid, and naphthalene-2,6-dicarboxylate ester.

7. The polymer of claim 6 wherein said dicarboxylic acid component, (a) further includes a difunctional acid or acid equivalent selected from the group consisting of aromatic dicarboxylic acids having 8 to 14 carbon atoms, aliphatic dicarboxylic acids having 4 to 12 carbon atoms, cycloaliphatic dicarboxylic acids having 4 to 12 carbon atoms, and cycloaliphatic dicarboxylic acids having 8 to 12 carbon atoms.

8. The polymer of claim 7 wherein said difunctional acid equivalent is selected from the group consisting of acid anhydrides, esters, and acid chlorides of said acids.

9. The polymer of claim 7 wherein said difunctional acid is selected from the group consisting of phthalic acid, isophthalic acid, terephthalic acid, cyclohexanedicarboxylic acid, diphenyl-4,4'-dicarboxylic acid, succinic acid, glutaric acid, adipic acid, fumaric acid, azelaic acid, sebacic acid, 2,7-naphthalenedicarboxylic acid, 1,4-cyclohexanedicarboxylic acid, resorcinoldiacetic acid, diglycolic acid, 4,4'-oxybis(benzoic) acid, biphenyldicarboxylic acid, 1,12-dodecanedicarboxylic acid, 4,4'-sulfonyldibenzoic acid, 4,4'-methylenedibenzoic acid, trans-4,4'-stilbenedicarboxylic acid, and mixtures thereof.

10. The polymer of claim 4 wherein component (b) is a diol.

11. The polymer of claim 10 wherein said diol is selected from the group consisting of cycloaliphatic diols having 6 to 20 atoms and aliphatic diols preferably having 2 to 20 carbon atoms.

12. The polymer of claim 10 wherein said diol is selected from the group consisting of ethylene glycol, diethylene glycol, triethylene glycol, 1,4-cyclohexanedimethanol, propane-1,3-diol, butane-1,4-diol, pentane-1,5-diol, hexane-1,6-diol, 2,2-dimethyl-1,3-propanediol, 1,10-decanediol, 2,2,4,4-tetramethyl-1,3-cyclobutanediol, 3-methylpentanediol-(2,4), 2-methylpentanediol-(1,4), 2,2,4-trimethylpentane-diol-(1,3), 2-ethylhexanediol-(1,3), 2,2-diethylpropane-diol-(1,3), hexanediol-(1,3), 1,4-di-(hydroxyethoxy)-benzene, 2,2-bis-(4-hydroxycyclohexyl)-propane, 2,4-dihydroxy-1,1,3,3-tetramethyl-cyclobutane, 2,2-bis-(3-hydroxyethoxyphenyl)-propane, and 2,2-bis-(4-hydroxypropoxyphenyl)-propane.

13. The polymer of claim 4 wherein the diol of component (b) is at least 90 mole percent ethylene glycol.

14. The polymer of claim 4 wherein said diamine of component (b) is selected from the group consisting of 1,6-hexanediamine, meta- or para-xylylenediamine, 1,3- or 1,4-cyclohexane(bis)methylamine, aliphatic diamines having 2 to 12 carbon atoms, and mixtures thereof.

15. A poly(ethylene 2,6-naphthalene dicarboxylate) composition having a reduced fluorescence comprising residues from:

(a) a dicarboxylic acid component comprising from about 0.1 mole percent to about mol percent of a dicarboxylic acid selected from the group consisting of naphthalene-2,6-dicarboxylic acid, and naphthalene-2,6-dicarboxylate ester;

(b) a diol component; and (c) about 0.1 mole percent to 5 mole percent, based on 100 mole percent dicarboxylic acid and 100 mole percent diol, of a benzylidene compound capable of absorbing ultraviolet light radiation, said benzylidene compound having a polyester reactive group selected from carboxy, carbalkoxy, acyloxy and hydroxy, and has the following structure:

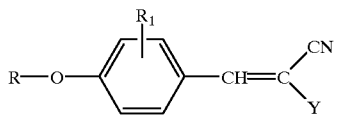

wherein R is selected from the group consisting of hydrogen, $C_{1-C8}$ alkyl, substituted $C_1$–$C_8$ alkyl, $C_3$–$C_8$ alkenyl, $C_3$–$C_8$ alkynyl, $C_3$–$C_8$ cycloalkyl, $C_3$–$C_8$ cycloalkenyl and —$R_2$-X, wherein $R_2$ is selected from the group consisting of $C_1$–$C_8$ alkylene, $C_2$–$C_8$ alkylene-O—$C_2$–$C_8$ alkylene, $C_2$–$C_8$ alkylene-S—$C_1$–$C_8$ alkylene, $C_2$–$C_8$ alkylene, $C_2$–$C_8$ alkylene-S—$C_2$–$C_8$ alkylene, $C_2$–$C_8$ alkylene-N(SO$_2$ $C_1$–$C_8$ alkyl)-$C_2$–$C_8$ alkylene and X is selected from the group consisting of hydroxy, carboxy, carboalkoxy and acyloxy; $R_1$ is hydrogen or has 1–3 moieties independently selected from the group consisting of hydroxy, $C_1$–$C_8$ alkyl, $C_1$–$C_8$ alkoxy and halogen; Y is selected from the group consisting of carbalkoxy, cyano, carbamoyl, substituted carbamoyl, aryl, aroyl, $C_1$–$C_8$ alkylsulfonyl and arylsulfonyl.

16. The composition of claim 15 wherein said diol of component (b) is at least 90 mole percent ethylene glycol.

17. The composition of claim 15 further comprising a second polymer selected from the group consisting of PET, PET copolyester containing up to 20 mole % isophthalic acid, PET copolyester containing up to 70 mole % 1,4-cyclohexanedimethanol, PET copolyester containing up to 37 mole % diethylene glycol, PET copolyester containing up to 50 mole % 1,4-butanediol, poly(1,4-butyleneterephthalate) (PBT), PBT copolyester containing up to 15 mole % ethylene glycol, poly(ethylene 1,4-cyclohexanedicarboxylate), poly(1,4-cyclohexyldimethylene terephthalate) (PCT), PCT copolyester containing up to 18 mole % ethylene glycol, PCT copolyester containing up to 40 mole percent isophthalic acid, polycarbonate and mixtures thereof.

18. A method for preparing a polymer blend containing a naphthalenedicarboxylic acid residue wherein the polymer exhibits reduced fluorescence comprising:

(a) melt blending a polyester comprising:
   (i) dicarboxylic acid component having at least 0.1 mole percent of a dicarboxylic acid group selected from the group consisting of naphthalene-2,6-dicarboxylic acid and naphthalene-2,6-dicarboxylate ester; and
   (ii) a diol component; with (b) about 0.01 mole percent to about 5 mole percent, based on 100 mole percent of said dicarboxylic acid and 100 mole percent of said diol, of a benzylidene compound capable of absorbing ultraviolet light radiation.

19. The method of claim 18 further comprising blending with said naphthalenedicarboxylic acid residue containing blend a second polymer comprising:

(a) an acid or acid residue selected from the group consisting of terephthalic acid, 1,4-cylohexanedicarboxylic acid, isophthalic acid, naphthalenedicarboxylic acid and mixtures thereof; and (b) one or more glycols selected from the group consisting of ethylene glycol, 1,4-butanediol, 1,6-hexanediol, 1,4-cyclohexanedimethanol, and 2,2-dimethyl-1,3-propanediol.

20. The method of claim 19 wherein said second polymer is selected from the group consisting of PET, PET copolyester containing up to 20 mole % isophthalic acid, PET copolyester containing up to 70 mole % 1,4-cyclohexanedimethanol, PET copolyester containing up to 37 mole % diethylene glycol, PET copolyester containing up to 50 mole % 1,4-butanediol, poly(1,4-butyleneterephthalate)(PBT), PBT copolyester containing up to 15 mole % ethylene glycol, poly(ethylene 1,4-cyclohexanedicarboxylate), poly(1,4-cyclohexyldimethylene terephthalate) (PCT), PCT copolyester containing up to 18 mole % ethylene glycol, PCT copolyester containing up to 40 mole percent isophthalic acid, polycarbonate and mixtures thereof.

* * * * *